United States Patent
Ohmae et al.

(10) Patent No.: US 12,053,747 B2
(45) Date of Patent: Aug. 6, 2024

(54) PHANTOM, METHOD FOR PRODUCING SAME, AND KIT FOR MAKING PHANTOM

(71) Applicant: HAMAMATSU PHOTONICS K.K., Hamamatsu (JP)

(72) Inventors: Etsuko Ohmae, Hamamatsu (JP); Kenji Yoshimoto, Hamamatsu (JP); Hiroko Wada, Hamamatsu (JP); Yukio Ueda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1272 days.

(21) Appl. No.: 16/534,227

(22) Filed: Aug. 7, 2019

(65) Prior Publication Data

US 2020/0061552 A1 Feb. 27, 2020

(30) Foreign Application Priority Data

Aug. 22, 2018 (JP) .................... 2018-155763

(51) Int. Cl.

| | |
|---|---|
| *G01N 21/359* | (2014.01) |
| *B01F 23/40* | (2022.01) |
| *B01F 23/41* | (2022.01) |
| *C09K 23/14* | (2022.01) |
| *G01N 21/27* | (2006.01) |
| *G01N 21/17* | (2006.01) |

(52) U.S. Cl.
CPC .......... *B01F 23/4105* (2022.01); *B01F 23/49* (2022.01); *C09K 23/14* (2022.01); *G01N 21/278* (2013.01); *G01N 21/359* (2013.01); *B01F 23/4145* (2022.01); *B01F 23/48* (2022.01); *G01N 2021/1789* (2013.01)

(58) Field of Classification Search
CPC .. B01F 23/4105; B01F 23/49; B01F 23/4145; B01F 23/48; G01N 21/278; G01N 21/359; G01N 2021/1789; G01N 21/4785; G01N 21/49; C09K 23/00
USPC .......................................................... 436/13
See application file for complete search history.

(56) References Cited

U.S. PATENT DOCUMENTS

| | | | |
|---|---|---|---|
| 6,475,800 B1 * | 11/2002 | Hazen | G01N 21/274 436/166 |
| 2017/0172859 A1 * | 6/2017 | Thibodeau | A61K 47/12 |

FOREIGN PATENT DOCUMENTS

| | | |
|---|---|---|
| JP | 2008-522158 A | 6/2006 |
| JP | 2008-119286 A | 5/2008 |
| JP | 2008-527321 A | 7/2008 |
| JP | 2011-518339 A | 6/2011 |
| JP | 6140720 B2 | 5/2017 |
| JP | 2018-196643 A | 12/2018 |

(Continued)

OTHER PUBLICATIONS

Genki Horiguchi et al., "Fundamental study on detection of a blood vessel in fat", The Institute of Electronics, Information and Communication Engineers (IEICE) Technical Report, Jan. 18, 2018, vol. 117 No. 403, p. 117-p. 122 (with attached English-language translation).

(Continued)

*Primary Examiner* — Prem C Singh
*Assistant Examiner* — Francis C Campanell
(74) *Attorney, Agent, or Firm* — Faegre Drinker Biddle & Reath LLP (57) ABSTRACT

The present invention relates to the phantom comprises water, an oil, an emulsifier and an oil coagulating agent.

14 Claims, 7 Drawing Sheets

(56) References Cited

FOREIGN PATENT DOCUMENTS

| WO | WO 2006/058141 A2 | 6/2006 |
|---|---|---|
| WO | WO 2006/070252 A1 | 7/2006 |
| WO | WO 2009/131989 A2 | 10/2009 |

OTHER PUBLICATIONS

Shigeru Sekine et al., "Personal Care Handbook vol. II", Jun. 7, 2016 (with attached English-language translation).

Sean Merritt, B.S. et al., "Comparison of Water and Lipid Content Measurements Using Diffuse Optical Spectroscopy and MRI in Emulsion Phantoms," Technology in Cancer Research & Treatment, Dec. 2003, pp. 563-569, vol. 2, No. 6.

Kelly E. Michaelsen et al., "Anthropomorphic breast phantoms with physiological water, lipid, and hemoglobin content for near-infrared spectral tomography," Journal of Biomedical Optics, Feb. 2014, pp. 026012-1 0 026012-8, vol. 19, No. 2.

E. Ohmae et al., "Evaluation of phantoms with various water and lipid contents by using a six-wavelength time-resolved spectroscopy system," https://www.osapublishing.org/abstract.cfm?uri=OTS-2018-JTu3A.43, http://emessaging.vertexcommunication.com/ct/52534902:JfA2KmCNh:m:1:2798119176:241E5EBDB66A9F2C8555CCE75368A775:r, Mar. 28, 2018.

E. Ohmae et al., "Evaluation of phantoms with various water and lipid contents by using a six-wavelength time-resolved spectroscopy system," OSA Biophotonics Congress: Biomedical Optics, The Diplomat Beach Resort Hollywood, Florida USA, Apr. 3-6, 2018.

"What to Know Before You Go," OSA Biophotonics Congress: Biomedical Optics, Mar. 28, 2018, 4 pages.

OSA Biophotonics Congress: Biomedical Optics, Clinical and Translational Biophotonics (Translational), Optics and the Brain (Brain), Optical Tomography and Spectroscopy (OT&S), Microscopy, Histopathology and Analytics (Microscopy), Apr. 3-6, 2018, The Diplomat Beach Resort, Hollywood, Florida USA, pp. 1-62.

\* cited by examiner

| Water:lipid | 40:60 | 20:80 | 5:95 |
|---|---|---|---|
| Emulsion type | Water-in-oil type | | |
| Materials | Water | Distilled water | | |
| | Lipid | Soybean oil | | |
| | Emulsifying agent | Soybean Lecithin | | |
| | Coagulating agent | Oil coagulating agent | | |
| Photographs | Upper surface | | | |
| | Cut section | | | |
| | MRI | | | |

PHANTOM, METHOD FOR PRODUCING SAME, AND KIT FOR MAKING PHANTOM

TECHNICAL FIELD

The present invention relates to a phantom, a method for producing the phantom, and a kit for making the phantom.

BACKGROUND

Near infrared spectroscopy (NIRS) covering a wavelength range of 650 to 1000 nm is widely used for noninvasively acquiring information of light absorption by hemoglobin, water and lipid in human tissues. NIRS is used as, for example, a method for monitoring tumor response in neoadjuvant chemotherapy for breast cancer. In application of NIRS, accurate measurement of the amounts of water and lipid in addition to the hemoglobin concentration is important. The hemoglobin concentration and the amounts of water and lipid reflect, for example, angiogenic activity, anti-inflammatory response and edema volume, and can serve as prognostic biomarkers in chemotherapy. Phantoms in which the amounts of water and lipid can be each controlled to fall within a predetermined range are useful for evaluating accuracy in measurement of the amounts of water and lipid in NIRS systems.

A variety of phantoms including water and lipid at various ratios have been heretofore proposed. For example, in Non Patent Literature 1, liquid phantoms are made by emulsifying different amounts of water and lipid, and instrumentally evaluated. Non Patent Literature 2 discloses a solid phantom made by incorporating a thickener rather than emulsifying water and an oil. Further, Patent Literature 1 discloses a specific oil-in-water emulsion to fill mannequins or phantoms used for measurement of specific absorption rate, measurement of total radiation power or measurement of total radiated sensitivity, the predetermined oil-in-water emulsion including an aqueous phase and an oil phase. Patent Literature 2 discloses a human body equivalent phantom formed by mixing purified water, a vegetable oil and detergent while adjusting electric properties by the mixing ratio of the purified water, the vegetable oil and the detergent, and forming the resulting mixture into a gel using kanten (agar-agar) and a thickener.

CITATION LIST

Patent Literature

Patent Literature 1: Japanese Patent No. 6140720
Patent Literature 2: Japanese Unexamined Patent Publication No. 2008-119286

Non Patent Literature

Non Patent Literature 1: Merritt et. al., Technol Cancer Res Treat., 2003, 2(6), 563-569
Non Patent Literature 2: Michaelsen et al., 2014, Journal of Biomedical Optics, 2014, 19(2), 026012

SUMMARY

It is desirable that phantoms used for optical measurement by NIRS or the like have a scattering coefficient close to that of a living organism.

The present invention has been made in view of the above-described circumstances, and a problem to be solved by the present invention is to provide a phantom having a scattering coefficient close to that of a living organism.

The present invention relates to a phantom comprising water, an oil, an emulsifier and an oil coagulating agent. The phantom of the present invention, which has the configuration described above, has a scattering coefficient close to that of a living organism.

It is preferable that the oil coagulating agent comprise 12-hydroxystearic acid.

The present invention also relates to a method for producing a phantom, comprising a step of mixing an oil, water, an emulsifier and an oil coagulating agent to obtain a mixed liquid, wherein the mixing of the oil and the water is carried out by performing stirring while adding the water to the oil little by little in the presence of the emulsifier.

The present invention also relates to a kit for making a phantom, comprising water, an oil, an emulsifier and an oil coagulating agent.

According to the present invention, it is possible to provide a phantom having a scattering coefficient close to that of a living organism. The phantom of the present invention is also excellent in long-term stability of optical properties (absorption coefficient and scattering coefficient).

DETAILED DESCRIPTION

Hereinafter, embodiments of the present invention will be described in detail. However, the present invention is not limited to the following embodiments.

[Phantom]

A phantom of this embodiment comprises water, an oil, an emulsifier and an oil coagulating agent. The phantom of this embodiment can be used, for example, for optical measurement, electrical measurement, measurement of physical properties and the like. The phantom of this embodiment has a scattering coefficient close to that of a living organism, and therefore can be suitably used as a phantom for optical measurement. Further, the phantom of this embodiment is also excellent in long-term stability of optical properties (absorption coefficient and scattering coefficient).

The phantom of this embodiment is an emulsified product containing the above-described components, preferably a water-in-oil emulsified product (water-in-oil emulsion). The phantom of this embodiment may be liquid, solid or gelatinous. It is preferable that the phantom of this embodiment be solid at 15 to 45° C. (preferably 37° C.) (a solid phantom).

Examples of the water include distilled water, common water, purified water, sterilized purified water, water for injection and distilled water for injection.

Examples of the oil include a vegetable oil, an animal oil and a mineral oil. Examples of the vegetable oil include soybean oil, rapeseed oil, olive oil and coconut oil. Examples of the animal oil include lard, fish oil, squalane and beeswax. Examples of the mineral oil include paraffin, hydrogenated polyisobutene, liquid paraffin, gelatinized hydrocarbons (plastibase and the like) and petroleum jerry. The oils may be used singly or in combinations of two or more thereof.

The volume ratio of water to the oil (lipid) (water:lipid) in the phantom may be 1:99 to 99:1, and is preferably 60:40 to 5:95, more preferably 40:60 to 20:80.

Examples of the emulsifier include lecithin, enzymatically decomposed lecithin (for example SLP-WhiteLyso), polysorbate 20 and sorbitan monostearate. It is preferable that the emulsifier be an emulsifier having an Hlb close to the Hlb of the oil used. The lecithin may be egg yolk-derived lecithin (egg yolk lecithin) or soybean-derived lecithin (soybean lecithin). It is preferable that the emulsifier be lecithin).

The content of the emulsifier may be 0.5% by mass or more, 0.6% by mass or more, 0.7% by mass or more, 0.8% by mass or more, 0.9% by mass or more, or 1.0% by mass or more, and may be 5.0% by mass or less, 3.0% by mass or less, 2.0% by mass or less or 1.5% by mass or less per 100% by mass of the oil.

The oil coagulating agent is also referred to as an "oil gelatinizing agent", a "solidification treatment agent" or the like. Examples of the oil coagulating agent include metal soaps (metal salts of fatty acids), 12-hydroxystearic acid, dibenzylidene sorbitol, and derivatives of N-acylamino acids such as amides, esters or amine salts thereof. Examples of the metal soap include fatty acid salts of metals such as calcium, lithium and aluminum, and examples of the fatty acid include stearic acid, palmitic acid, 2-ethylhexanoic acid and 12-hydroxystearic acid. It is preferable that the oil coagulating agent comprise 12-hydroxystearic acid. As the oil coagulating agent, a commercialized product may be used as it is. The oil coagulating agents may be used singly or in combinations of two or more thereof.

The content of the oil coagulating agent may be 1% by mass or more, 1.5% by mass or more or 2% by mass or more, and may be 5.0% by mass or less, 4.0% by mass or less or 3.5% by mass or less per 100% by mass of the oil.

The scattering coefficient of the phantom of this embodiment at a wavelength of 750 to 1000 nm may be 5 to 20 $cm^{-1}$. The lower limit of the scattering coefficient at a wavelength of 750 to 1000 nm may be 5 $cm^{-1}$ or more, 6 $cm^{-1}$ or more, 7 $cm^{-1}$ or more, 8 $cm^{-1}$ or more, 9 $cm^{-1}$ or more or 10 $cm^{-1}$ or more, and the upper limit of the scattering coefficient at a wavelength of 750 to 1000 nm may be 20 $cm^{-1}$ or less, 19 $cm^{-1}$ or less, 18 $cm^{-1}$ or less, 17 $cm^{-1}$ or less, 16 $cm^{-1}$ or less, 15 $cm^{-1}$ or less, 14 $cm^{-1}$ or less, 13 $cm^{-1}$ or less, 12 $cm^{-1}$ or less or 11 $cm^{-1}$ or less.

The scattering coefficient of the phantom of this embodiment at a wavelength of 750 to 1000 nm is a reduced scattering coefficient as measured by the method disclosed in Examples described later.

The scattering coefficient at a wavelength of 700 to 1000 nm can be adjusted by the types and amounts of an oil and an emulsifier to be used, control of emulsification conditions (for example temperature during emulsification), and the like.

The phantom may contain components other than water, an oil, an emulsifier and a water coagulating agent (other components). Examples of the other components include preservatives and inks.

The phantom of this embodiment can be kept solid at 15 to 45° C., and therefore can be used, for example, as a layered product obtained by stacking a plurality of phantoms having different water/lipid ratios (volume ratios of water to oil).

[Method for Producing Phantom]

One example of a method for producing a phantom according to this embodiment will be described. The method for producing a phantom according to this embodiment comprises a step of mixing an oil, water, an emulsifier and an oil coagulating agent to obtain a mixed liquid (mixing step).

The mixing of the oil and the water is carried out by performing stirring while adding the water to the oil little by little in the presence of the emulsifier. Consequently, a water-in-oil emulsion including at least an oil, water and an emulsifier is formed. That is, it is preferable that the mixing step comprise producing a water-in-oil emulsion by performing stirring under a condition in which at least a part of water, an oil and an emulsifier are present.

The phrase "performing stirring while adding an oil to water little by little" means that stirring is performed while water in an amount smaller than that of an oil is added at such a rate that separation between the oil and the water cannot be visually recognized. The rate at which water is added to an oil may be 40 to 90 mL/min, or 50 to 80 mL/min.

By performing stirring while adding water to an oil little by little in the presence of an emulsifier, a phantom having a scattering coefficient close to that of a living organism can be easily produced.

In the mixing step, the oil coagulating agent may be mixed with an oil beforehand, followed by mixing water in the presence of the emulsifier, or an oil may be mixed with water in the presence of the emulsifier, followed by mixing the oil coagulating agent. The emulsifier may be mixed with an oil or water beforehand. The mixing may be carried out by, for example, performing stirring with a blender.

The water may be mixed with the oil (lipid) at a volume ratio (water:oil) of 1:99 to 99:1, and the volume ratio (water:oil) is preferably 20:80 to 5:95, more preferably 40:60 to 20:80.

The method for producing a phantom according to this embodiment may comprise a step of solidifying the mixed liquid after the mixing step, and may further comprise a step of stirring the mixed liquid at 60 to 90° C. (a first stirring step), a step of filtering the mixed liquid (filtration step), a step of stirring the mixed liquid at 0 to 5° C. (a second stirring step) and the like after the mixing step and before the solidification step.

In the first stirring step, the mixed liquid is stirred at 60 to 90° C. The temperature in the first stirring step may be 60° C. or higher, 65° C. or higher, 70° C. or higher, 75° C. or higher, 80° C. or higher or 85° C. or higher, and may be 90°

C. or lower or 87° C. or lower. In the first stirring step, the stirring can be performed by using, for example, a glass rod.

In the filtration step, the mixed liquid is filtered. The filtration can be performed by using, for example, a filter (for example stocking). The filtration step may be carried out after the first stirring step.

In the second stirring step, the mixed liquid is stirred at 0 to 10° C. The temperature in the second stirring step may be 0° C. or higher, or higher than 0° C., and may be 10° C. or lower, or 5° C. or lower. The second stirring step can be carried out by, for example, stirring the mixed liquid in an iced water bath. The second stirring step may be terminated at the time when solidification of the mixed liquid starts. The second stirring step may be carried out after the first stirring step or after the filtration step.

In the solidification step, the mixed liquid is solidified. The solidification step can be carried out by, for example, leaving the mixed liquid to stand at 0 to 10° C., 2 to 8° C. or 3 to 6° C. The solidification step can be carried out by, for example, leaving the mixed liquid to stand in a refrigerator. The solidification step may be carried out after the first stirring step, after the filtration step or after the second stirring step.

[Kit for Making Phantom]

A kit for making a phantom according to this embodiment (hereinafter, also referred to as "this kit") comprises water, an oil, an emulsifier and an oil coagulating agent. The emulsifier and the oil coagulating agent may be each mixed with water or an oil beforehand, or may be included independently in this kit. This kit may further comprise the above-described other components (preservative, ink and the like). The other components may be mixed with water, the oil, the emulsifier or the oil coagulating agent beforehand, or may be included independently of these components in this kit.

EXAMPLES

Hereinafter, the present invention will be described more specifically based on Examples. However, the present invention is not limited to the following examples.

<Making Phantom>

Example 1

600 mL (550 g) of soybean oil (RIKEN Nosan-Kako Co., Ltd.) was mixed with 5.5 g of soybean-derived lecithin (manufactured by FUJIFILM Wako Pure Chemical Corporation) (1% by mass of soybean-derived lecithin per 100% by mass of soybean oil) as an emulsifier and 15 g of finely divided powder of Katameru Tempuru (trade name, Johnson Company, Limited, ingredient: 100% of natural fat and oil-based fatty acid extracted from a plant (castor-oil plant), including 12-hydroxystearic acid) as an oil coagulating agent. The resulting mixture was stirred by a blender while 400 mL of distilled water was mixed therewith little by little. The obtained mixture was warmed in a thermostat bath at 85° C. for 25 minutes while being stirred with a glass rod. The obtained mixture was filtered through a stocking, and added into a container (size: 151 mm×151 mm×90 mm). The filtrate was stirred with a glass rod while being cooled with iced water, and was put in a refrigerator at the time of starting setting. In this way, a phantom of Example 1 (water:lipid=40:60 (volume ratio)) was obtained.

Figure 1A:
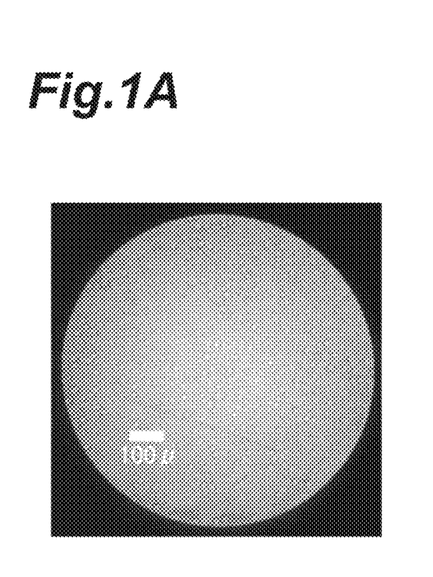
FIG. 1A shows a microscope photograph showing the results of observing an oil-in-water emulsion.
Figure 1B:
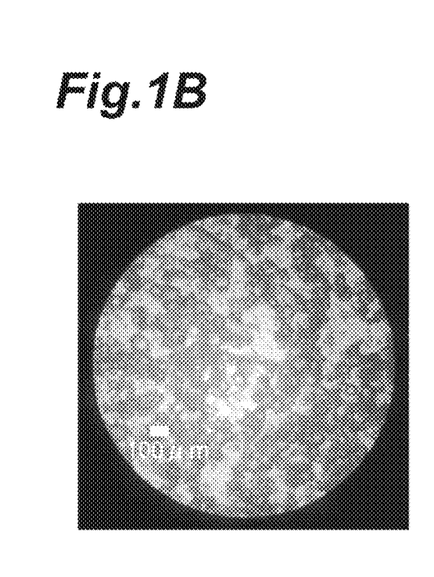
FIG. 1B shows a microscope photograph showing the results of observing an water-in-oil emulsion.

FIG. 1A and FIG. 1B shows microscope photographs showing the results of examining the emulsion type of the phantom of Example 1. In a case where when an emulsion in which the volume ratio of water to the oil (water:oil) was 40:60 was made using an emulsifier, water was mixed with (added to) the oil little by little, a water-in-oil emulsion was obtained (FIG. 1B). On the other hand, in a case where water was added to the oil in one stage, an oil-in-water emulsion was obtained (FIG. 1A). Soybean lecithin was used as the emulsifier, and soybean oil was used as the oil. The above results reveal that the emulsion type of the phantom of Example 1 is a water-in-oil type.

Example 2

800 mL (736 g) of soybean oil (RIKEN Nosan-Kako Co., Ltd.) was mixed with 7 g of soybean-derived lecithin (manufactured by FUJIFILM Wako Pure Chemical Corporation) (1% by mass of soybean-derived lecithin per 100% by mass of soybean oil) as an emulsifier and 22.5 g of finely divided Katameru Tempuru as an oil coagulating agent. The resulting mixture was stirred by a blender while 200 mL of distilled water was added thereto little by little. The obtained mixture was warmed in a thermostat bath at 85° C. for 25 minutes while being stirred with a glass rod. The obtained mixture was filtered through a stocking, and added into a container (size: 151 mm×151 mm×90 mm). The filtrate was stirred with a glass rod while being cooled with iced water, and was put in a refrigerator at the time of starting setting. In this way, a phantom of Example 2 (water:lipid=20:80 (volume ratio)) was obtained.

Example 3

950 mL (874 g) of soybean oil (RIKEN Nosan-Kako Co., Ltd.) was mixed with 8.7 g of soybean-derived lecithin (manufactured by FUJIFILM Wako Pure Chemical Corporation) (1% by mass of soybean-derived lecithin per 100% by mass of soybean oil) as an emulsifier and 30 g of finely divided Katameru Tempuru as an oil coagulating agent. The resulting mixture was stirred by a blender while 50 mL of distilled water was added thereto little by little. The obtained mixture was warmed in a thermostat bath at 85° C. for 25 minutes while being stirred with a glass rod. The obtained mixture was filtered through a stocking, and added into a container (size: 151 mm×151 mm×90 mm). The filtrate was stirred with a glass rod while being cooled with iced water, and was put in a refrigerator at the time of starting setting. In this way, a phantom of Example 3 (water:lipid=5:95 (volume ratio)) was obtained.

For evaluation of the phantoms of Examples 1 to 3, a six-wavelength time-resolved spectroscopy system (TRS-21-6W) and a magnetic resonance imaging method (MRI) were used.

<Measurement by TRS-21-6W>

(Apparatus)

Figure 2A:
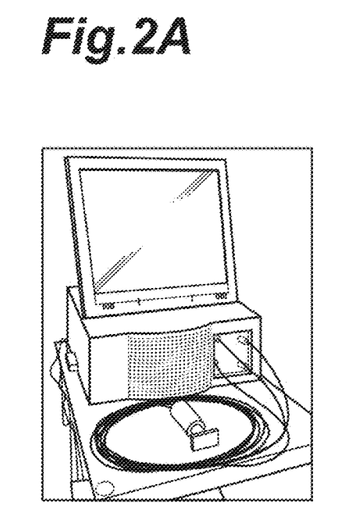
FIG. 2A shows a six-wavelength time-resolved spectroscopy system apparatus.
Figure 2B:
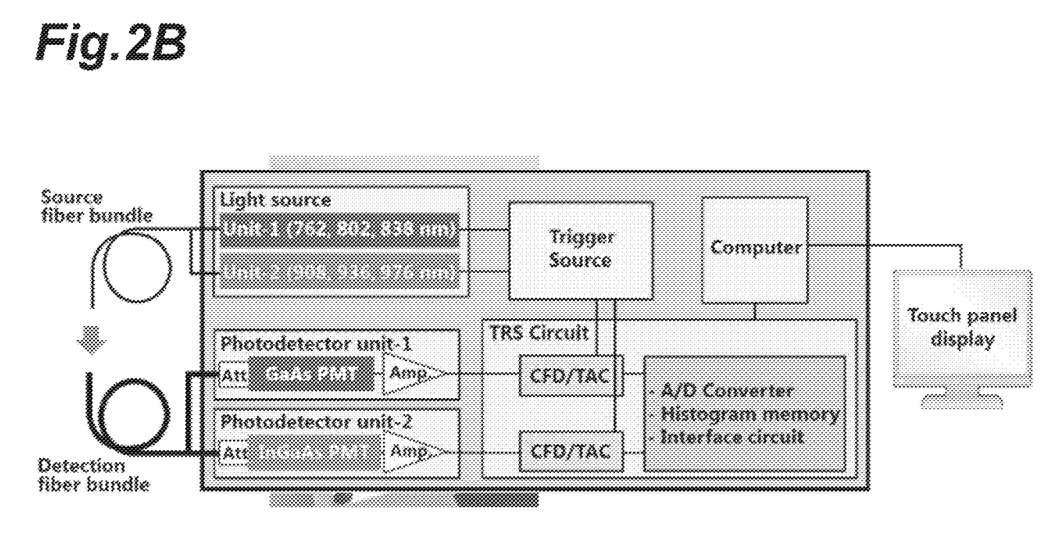
FIG. 2B shows a block diagram of the configuration of the apparatus.

FIG. 2A shows the appearance of an apparatus used for measurement by TRS-21-6W, and FIG. 2B shows a block diagram of the configuration of the apparatus.

The TRS system is composed of a light source, two photodetector units, a TRS circuit and an optical fiber (FIG. 2A and FIG. 2B). The light source has six laser diodes (762 nm, 802 nm, 838 nm, 908 nm, 936 nm and 976 nm) each radiating a pulse laser beam having a pulse width of 100 ps to 200 ps (full width at half maximum), and a frequency with a pulse repetition rate of 5 MHz.

A subject was irradiated with a pulse laser beam through an optical fiber bundle for a light source. Light propagated through the subject was collected at an optical fiber for detection, and guided to two photodetectors having different types of photomultiplier tubes (GaAs and InGaAs PMT, Hamamatsu Photonics K. K.). The detected light was converted into an electric signal by a photodetector unit, and processed in a TRS circuit designed on the basis of a time correlated single photon counting (TCSPC) method. The processed signal was acquired as a temporal profile of the detected light. In place of InGaAs PMT, MPPC (multi-pixel photon counter) can be used.

(Data Analysis)

In the TRS system, the measured temporal profile is analyzed on the basis of the light diffusion theory to measure the absorption coefficient ($\mu_a$) and the reduced scattering coefficient ($\mu_s'$) of a biotissue or the like in a scattering medium. The behavior of photons in the scattering medium is given by the photon diffusion equation (Appl. Opt. 28(12), 2331-2336 (1989).).

$$\frac{1}{c}\frac{\partial}{\partial t}\phi(r, t) - \nabla \cdot D(r)\nabla \phi(r, t) + \mu_a(r)\phi(r, t) = S(r, t), \quad (1)$$

Here, $\phi(r,t)$ represents a diffuse photon fluence rate at a position r and a time t, $D=\frac{1}{3}\mu_s'$ represents a photon diffusion coefficient, c represents a velocity of light in a medium, and $S(r,t)$ represents a light source.

In the TRS system, temporal profiles measured in refection and transmission arrangements can be analyzed by using analytic solutions of the photon diffusion equation obtained under several types of boundary conditions. Here, the phantom was measured in a reflection arrangement at a-source-detector separation d. A diffusion reflectance R (d,t) obtained from a solution of the equation (1) for a semi-infinite homogeneous model having an extrapolated boundary condition is given by the following equation.

$$R(d, t) = \frac{1}{2}(4\pi Dc)^{-3/2}t^{-5/2}\exp(-\mu_a ct) \cdot \left[z_0\exp\left(-\frac{z_0^2 + d^2}{4Dct}\right) + (z_0 + 2z_e)\exp\left(-\frac{(z_0 + 2z_e)^2 + d^2}{4Dct}\right)\right], \quad (2)$$

Here, $z_0=1/\mu_s'$ represents a transport mean free path, $z_e=2D(1+r_d)/(1-r_d)$ represents a linear extrapolation distance. $r_d$ represents an internal reflectance associated with variance in reflectance at a boundary, and is calculated from an approximate equation dependent on the refractive index (n) of a medium ($r_d=-1.440n^{-2}+0.710n^{-1}+0.668+0.0636n$). Therefore, the estimated temporal profile is obtained by calculating a convolution of an instrument response function (IRF) at R(d,t) in consideration of influences of IRF (J. Biomed. Opt. 1(3), 330-335 (1996), J. Biomed. Opt. 8 (3), 512-517 (2003)). $\mu_a$ and $\mu_s'$ of a medium are determined by fitting the estimated profile to the measured profile by using a non-linear least-squares method based on the Levenberg-Marquardt algorithm. The absorption coefficient obtained for each wavelength $\lambda$ is given by the following linear combination.

$$\mu_a(\lambda) = \sum_{i=1}^{m} C_i \varepsilon_i(\lambda), \quad (3)$$

Here, m represents the number of light absorbing substances, $C_i$ represents a concentration, and $\varepsilon_i(\lambda)$ is an absorption coefficient of the ith light absorbing substance. The absorption coefficient can be measured by a spectrophotometer, and the concentration is determined by the simultaneous equations of the formula (3). Although main light absorbing substances absorbing light having a near infrared wavelength in a biotissue include deoxyhemoglobin, oxyhemoglobin, water and lipid, the light absorbing substances in the proposed phantom were assumed to include only water and lipid. Further, absorption of light by the emulsifier and the coagulating agent was assumed to be negligible. The absorption spectrum of water was measured by using a spectrophotometer (U-3500, Hitachi High-Technologies Corporation, Tokyo, Japan). The absorption spectrum of the lipid used is reported in a document (J. Biomed. Opt. 10(5), 054004 (2005)).

(Measurement by MRI)

Data was acquired by using a 3.0T MR unit (Discovery 750w, GE Healthcare, Waukesha, WI). As a proton density fat fraction (PDFF) pulse sequence, a commercially available sequence provided by a manufacturer of a MR unit (IDEAL IQ, GE Healthcare) (Radiology, 284(1), 244-254 (2017), Magn. Reson. Med. 77(4), 1516-1524 (2017)). The pulse sequence refers to a multipoint Dixon technique in which a T1 flip angle is used to limit a T1 bias, six echos for modifying a T2 effect, and a multipeak fat model is used. The parameters of this sequence are as follows.

Cycling time: 7.3 ms; minimum echo time: 3 ms; visual field: 40×40 cm; matrix: 160×160; band width: 111.1 kHz; flip angle: 4°; section thickness: 7 mm; one-dimensional image having 36 sections.

By using software provided by the manufacturer of the MR unit (IDEAL IQ, GE Healthcare), an image was processed to prepare water, lipid, R2* and lipid fraction maps. The phantom was redisposed in the reverse direction, data were then acquired twice, and two additional measurements were made. The lipid fraction of the phantom was measured by using a medical imaging system (SYNAPSE Version 4.1, Fujifilm Medical, Tokyo, Japan). The water fraction was determined by subtracting the lipid fraction from 100%.

<Evaluation>

The amounts of water and lipid in each phantom were measured by a six-wavelength TRS system and MRI, and the results were compared with theoretical values. A TRS system probe was installed at the center of the phantom. In the lipid fraction map obtained by MRI, a rectangular region of interest (ROI) of 2 cm×5 cm was disposed immediately under the surface at the horizontal center of the phantom. For each phantom, an average value of four measured values was obtained.

Figure 3:
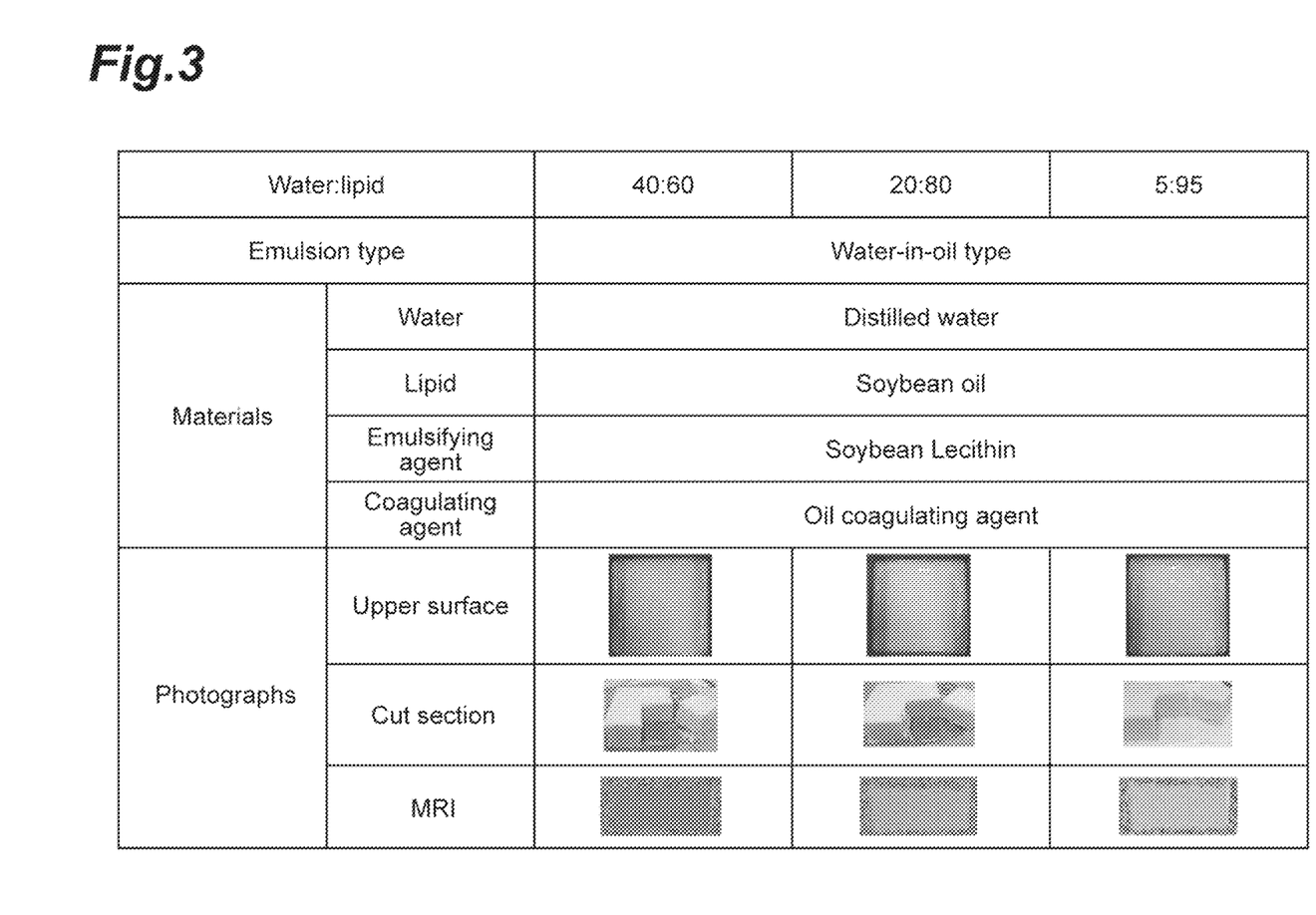
FIG. 3 shows photographs showing the upper surfaces and the cut sections of various phantoms.

FIG. 3 shows photographs of the upper surfaces, the cut sections and the MRI results of various phantoms. It was possible to easily cut out the phantoms of Examples 1 to 3 without losing their shapes. The phantoms of Examples 1 to 3 were homogeneous (see the photographs of cut sections in FIG. 3).

Figure 4:
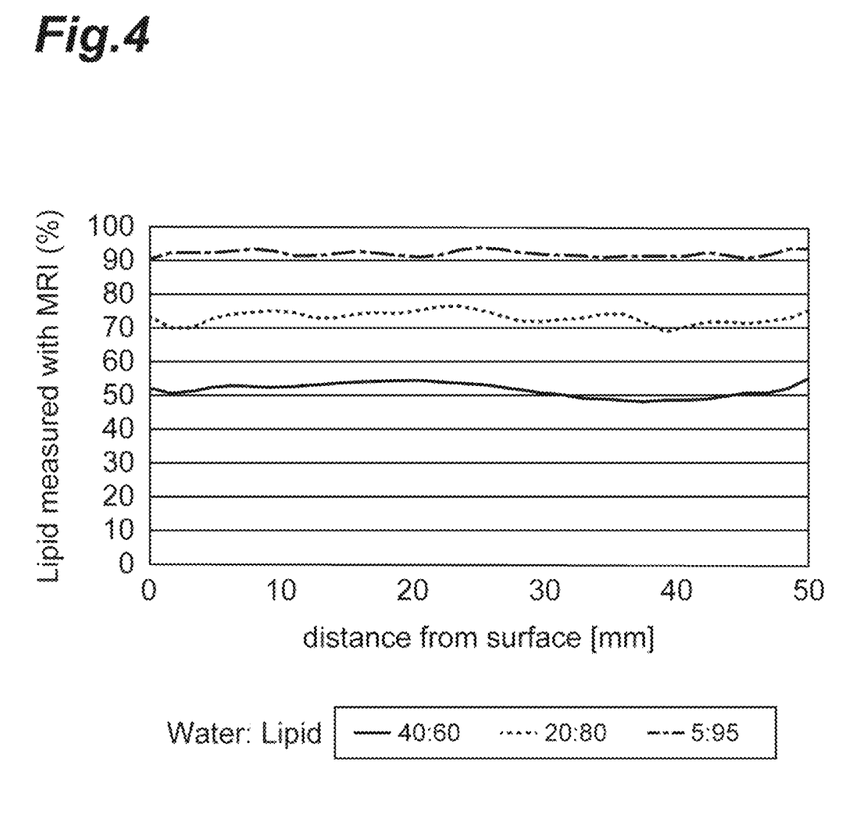
FIG. 4 shows a graph showing the results of measuring the lipid amount distributions of phantoms.

The amount of lipid in each of various phantoms was measured by MRI, and by using ImageJ/Fuji Software, the lipid amount distribution was evaluated over a range from the surface to the bottom surface of a 1 cm-wide ROI (region of interest) positioned at the center of the phantom (Nat. Methods, 9(7), 676-082 (2012)). The results are shown in FIG. 4. The results of lipid amount distributions in FIG. 4 showed that the phantoms were homogeneous.

Figure 5A:
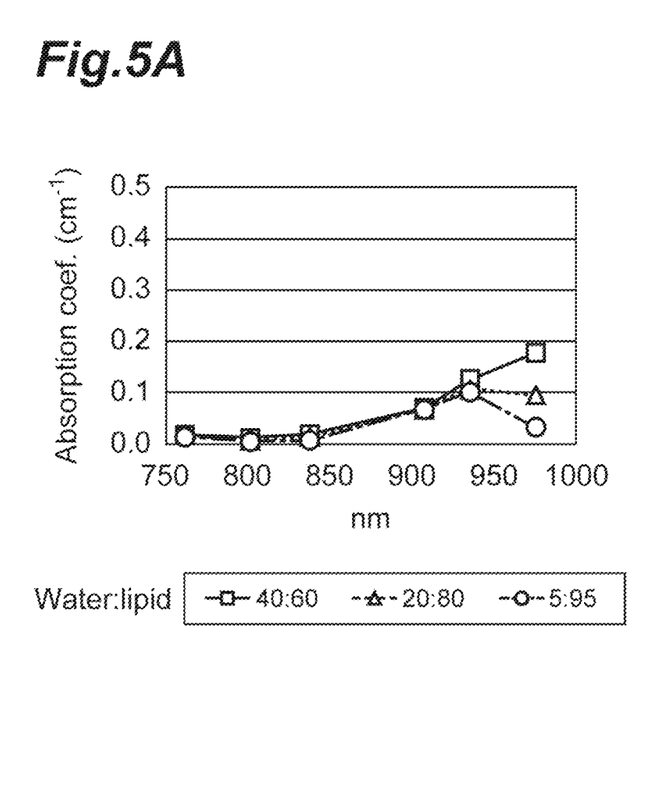
FIG. 5A shows a graph showing the results of measuring the absorption coefficients of phantoms.
Figure 5B:
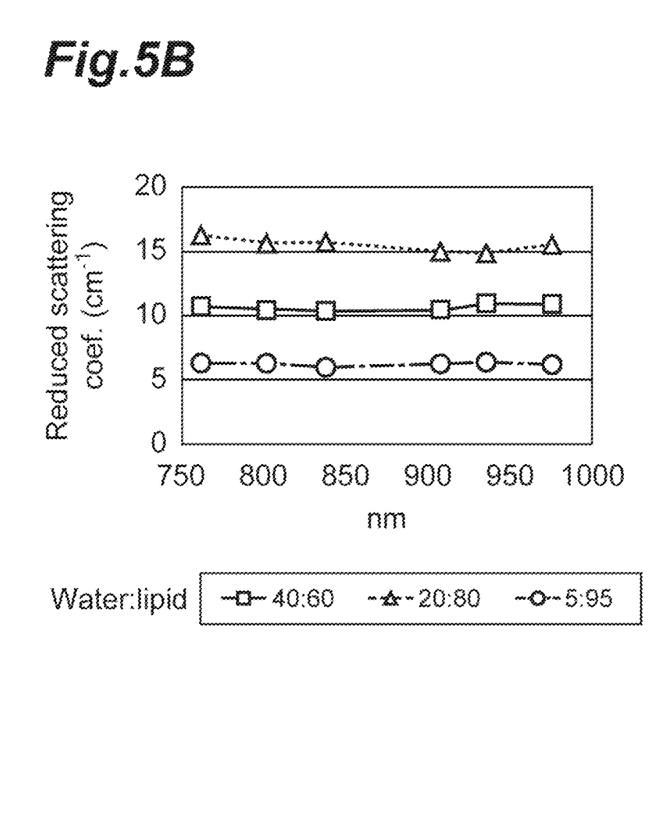
FIG. 5B shows a graph showing the results of measuring the scattering coefficients of phantoms.

FIG. 5A and FIG. 5B shows the results of measuring the optical properties (absorption coefficient and scattering coefficient) of various phantoms. FIG. 5A shows the results of measuring the absorption coefficients of various phantoms. The measured values at 935 nm and 975 nm were consistent with the peak absorption characteristics of lipid and water. FIG. 5B shows the scattering coefficients of various phantoms measured by TRS-21-6W. The phantoms of Examples 1 to 3 each had a scattering coefficient (5 to 15 $cm^{-1}$) close to that of a living organism (FIG. 5B).

Figure 6A:
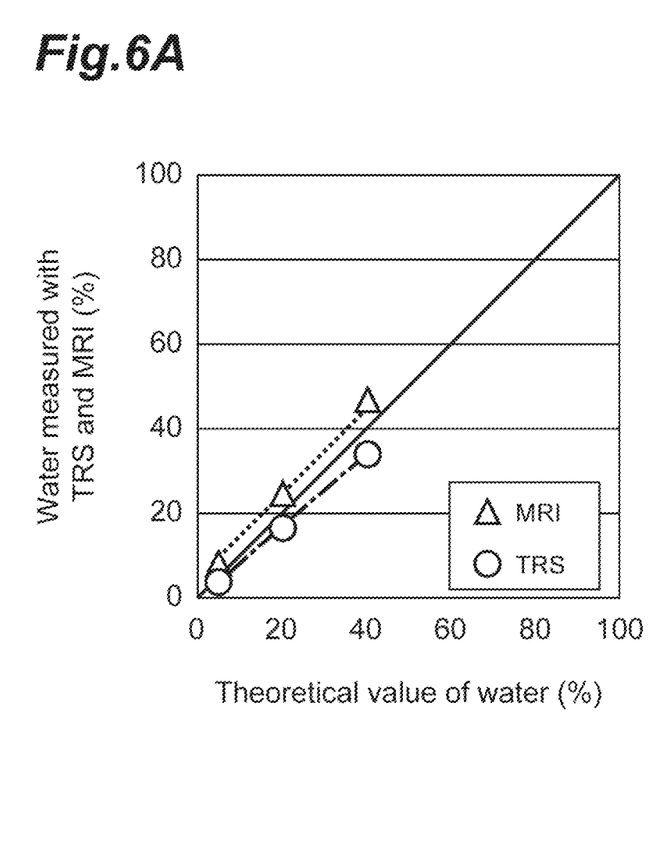
FIG. 6A shows a graph showing the results of measuring the amounts of water in phantoms.
Figure 6B:
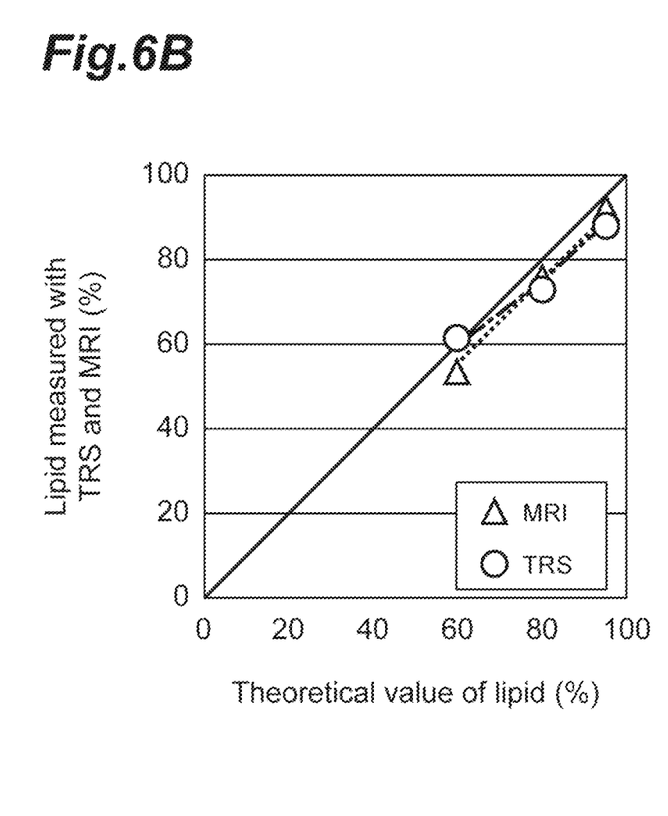
FIG. 6B shows a graph showing the results of measuring the amounts of lipid in phantoms.

FIG. 6A and FIG. 6B shows the results of measuring the amounts of water and lipid in each phantom by the six-wavelength TRS system and MRI. The results of measurement by the six-wavelength TRS system and MRI revealed that the measured values of the amounts of water and lipid were close to theoretical values, and phantoms having a desired water/lipid ratio were accurately made.

Figure 7A:
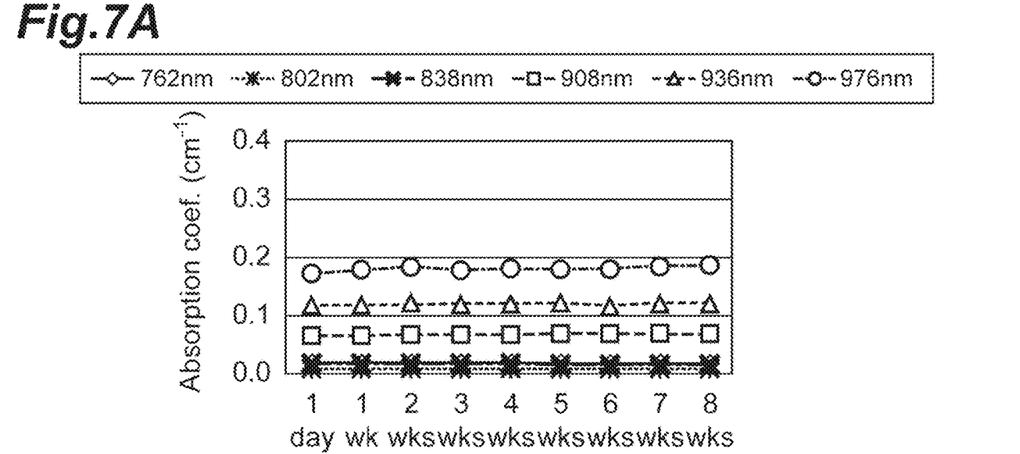
FIG. 7A shows a graph showing the results of testing the long-term stability of the absorption coefficients of phantoms.
Figure 7B:
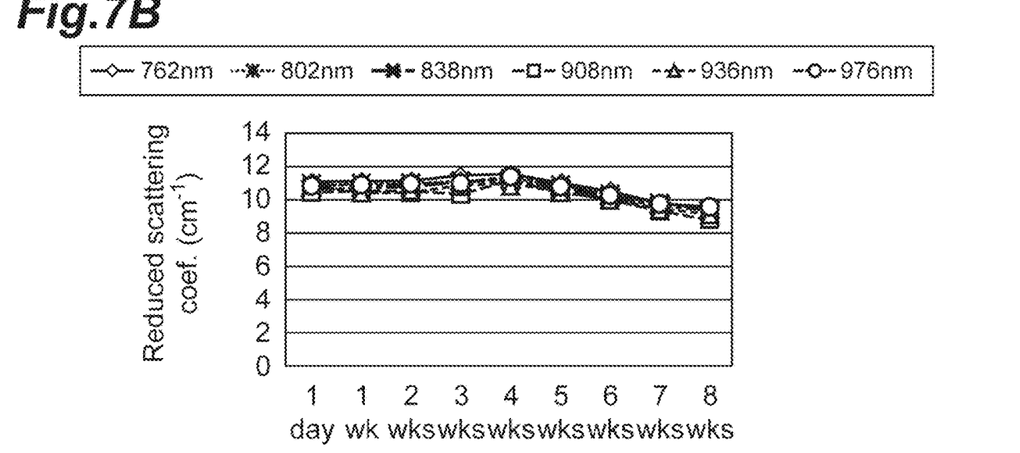
FIG. 7B shows a graph showing the results of testing the long-term stability of the scattering coefficients of phantoms.
Figure 7C:
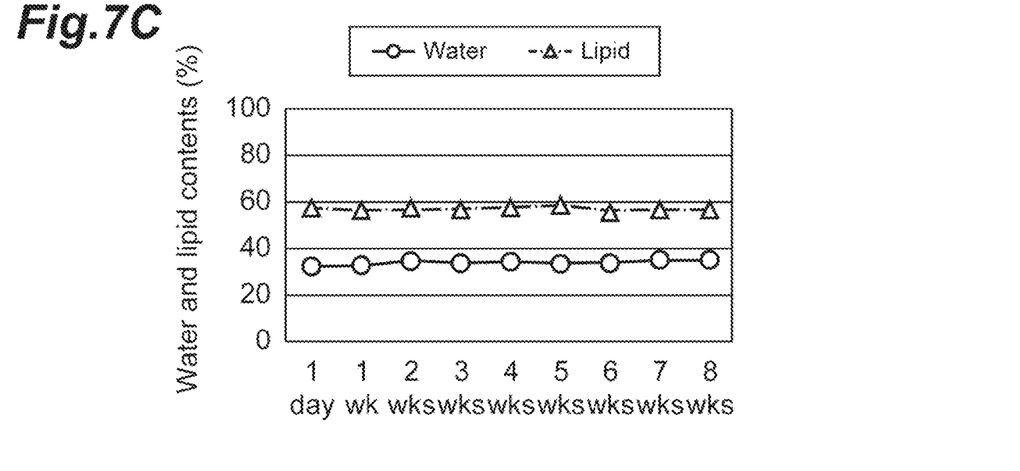
FIG. 7C shows a graph showing the results of testing the long-term stability of the water and lipid contents of phantoms.

Next, the long-term stability of various phantoms was evaluated. The results are shown in FIG. 7A and FIG. 7B. The long-term stability of the phantoms was evaluated by measuring the optical properties (absorption coefficient and scattering coefficient) of the phantoms every week by TRS-21-6W. As shown in FIG. 7A and FIG. 7B, the phantoms of Examples each maintained a scattering coefficient close to that of a living organism for at least a month. Further, it was not confirmed that the scattering coefficient significantly varied with time. Thus, the phantoms of Examples were shown to be excellent in long-term stability of optical properties (absorption coefficient and, scattering coefficient) . Further, the phantoms of Examples 1 to 3 each had a scattering coefficient close to that of a living organism even at the point of time when two months passed.

What is claimed is:

1. A phantom comprising:
   water;
   an oil, wherein a volume ratio of the water to the oil (water:oil) in the phantom is 60:40 to 5:95;
   an emulsifier; and
   an oil coagulating agent,
   wherein a scattering coefficient of the phantom at a wavelength of 750 to 1000 nm is 5 $cm^{-1}$ or more and 20 $cm^{-1}$ or less, and
   wherein the phantom is a water-in-oil emulsion.

2. The phantom according to claim 1, wherein the oil coagulating agent comprises 12-hydroxystearic acid.

3. A method for producing the phantom according to claim 1, comprising:
   a step of mixing the oil, the water, the emulsifier and the oil coagulating agent to obtain a mixed liquid, wherein the mixing of the oil and the water is carried out by performing stirring while adding the water to the oil little by little in the presence of the emulsifier.

4. A kit for making the phantom according to claim 1, comprising:
   the water;
   the oil;
   the emulsifier; and
   the oil coagulating agent.

5. The phantom according to claim 1, wherein the phantom is solid at 15° C. to 45° C.

6. The phantom according to claim 1, wherein the oil comprises soybean oil.

7. The phantom according to claim 1, wherein the emulsifier comprises lecithin.

8. The phantom according to claim 1, wherein a content of the emulsifier is 0.5% by mass or more and 1.5% by mass or less per 100% by mass of the oil.

9. The phantom according to claim 1, wherein the oil coagulating agent comprises at least one selected from the group consisting of a metal salt of a fatty acid, 12-hydroxystearic acid, dibenzylidene sorbitol, and a derivative of N-acylamino acid, wherein the derivative of the N-acylamino acid is an amide, an ester or an amine salt of the N-acylamino acid.

10. The phantom according to claim 1, wherein the oil coagulating agent comprises at least one selected from the group consisting of stearic acid, palmitic acid, 2-ethylhexanoic acid and 12-hydroxystearic acid and a salt thereof.

11. The phantom according to claim 1, wherein a content of the oil coagulating agent is 1% by mass or more and 5.0% by mass or less per 100% by mass of the oil.

12. The phantom according to claim 1, wherein the scattering coefficient of the phantom at a wavelength of 750 to 1000 nm is 7 $cm^{-1}$ or more and 15 $cm^{-1}$ or less.

13. A phantom comprising:
   water;
   an oil;
   an emulsifier, wherein a content of the emulsifier is 0.5% by mass or more and 1.5% by mass or less per 100% by mass of the oil; and
   an oil coagulating agent,
   wherein a scattering coefficient of the phantom at a wavelength of 750 to 1000 nm is 5 $cm^{-1}$ or more and 20 $cm^{-1}$ or less, and
   wherein the phantom is a water-in-oil emulsion.

14. A phantom comprising:
   water;
   an oil;
   an emulsifier; and
   an oil coagulating agent, wherein a content of the oil coagulating agent is 1% by mass or more and 5.0% by mass or less per 100% by mass of the oil,
   wherein a scattering coefficient of the phantom at a wavelength of 750 to 1000 nm is 5 $cm^{-1}$ or more and 20 $cm^{-1}$ or less, and
   wherein the phantom is a water-in-oil emulsion.

\* \* \* \* \*